(12) United States Patent
Black

(10) Patent No.: US 11,725,699 B2
(45) Date of Patent: Aug. 15, 2023

(54) CONE CLUTCH SYSTEM INCLUDING INDEPENDENT FRICTION MEMBER

(71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/564,288

(22) Filed: Dec. 29, 2021

(65) Prior Publication Data
US 2023/0204080 A1   Jun. 29, 2023

(51) Int. Cl.
*F16D 13/32* (2006.01)
*F16D 13/74* (2006.01)
*F16D 13/72* (2006.01)
*F16D 13/66* (2006.01)

(52) U.S. Cl.
CPC ............ *F16D 13/32* (2013.01); *F16D 13/66* (2013.01); *F16D 13/72* (2013.01); *F16D 13/74* (2013.01)

(58) Field of Classification Search
CPC .... F16D 13/24–36; F16D 13/32; F16D 13/66; F16D 13/72; F16D 13/74; F16D 25/0632; F16D 27/11; F16D 43/218
See application file for complete search history.

(56) References Cited

U.S. PATENT DOCUMENTS

| | | | |
|---|---|---|---|
| 2,865,481 A * | 12/1958 | Giri | F16D 25/0632 192/52.4 |
| 3,300,004 A | 1/1967 | Peterson | |
| 3,823,802 A | 7/1974 | Winzeller et al. | |
| 4,030,583 A * | 6/1977 | Miller | F16D 27/11 192/84.1 |
| 4,262,789 A | 4/1981 | Collins | |

(Continued)

FOREIGN PATENT DOCUMENTS

| EP | 1342932 B1 | 4/2008 |
|---|---|---|
| EP | 3273085 A1 | 1/2018 |

OTHER PUBLICATIONS

Lighter Rotors More Muscle, retrieved from https://www.ceramicdisctech.com on Jul. 21, 2021, 2 pp.

(Continued)

*Primary Examiner* — David R Morris
(74) *Attorney, Agent, or Firm* — Shumaker & Sieffert, P.A.

(57) ABSTRACT

In some examples, a cone clutch assembly includes an inner cone member defining a first friction surface; an outer cone member defining a second friction surface opposing the first friction surface; and an independent friction member positioned between the first friction surface of the inner cone member and the second friction surface of the outer cone member. The inner cone member and outer cone member are configured to be selectively engaged and disengaged from each other. When the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

18 Claims, 9 Drawing Sheets

(56) References Cited

U.S. PATENT DOCUMENTS

| | | | |
|---|---|---|---|
| 4,593,801 A * | 6/1986 | Takeuchi | F16D 13/46 192/70.15 |
| 6,834,751 B1 | 12/2004 | Magee | |
| 7,308,977 B2 | 12/2007 | Maguire et al. | |
| 7,799,250 B2 | 9/2010 | Huener et al. | |
| 3,051,968 A1 | 11/2011 | Arnold et al. | |
| 8,100,239 B2 | 1/2012 | Swanson et al. | |
| 8,893,868 B2 | 11/2014 | Kennedy | |
| 9,921,037 B2 | 3/2018 | Wadley et al. | |
| 10,830,286 B2 | 11/2020 | Zhang et al. | |
| 2004/0159524 A1 | 8/2004 | Carpenter et al. | |
| 2006/0049017 A1 | 3/2006 | Furuichi | |
| 2006/0180423 A1 * | 8/2006 | Kos | F16D 13/64 192/113.36 |
| 2007/0023253 A1 | 2/2007 | Wayman | |
| 2009/0114498 A1 | 5/2009 | Arnold et al. | |
| 2011/0259699 A1 | 10/2011 | Swanson | |
| 2015/0211586 A1 | 7/2015 | Hutchinson | |
| 2015/0267765 A1 | 9/2015 | Kim et al. | |
| 2016/0084321 A1 | 3/2016 | Mihajlovic et al. | |
| 2016/0178016 A1 | 6/2016 | Swift et al. | |
| 2018/0112720 A1 | 4/2018 | Choi et al. | |
| 2018/0266493 A1 * | 9/2018 | Dempfle | F16D 25/061 |
| 2019/0120309 A1 | 4/2019 | Sung et al. | |
| 2021/0054883 A1 * | 2/2021 | Grethel | F16D 3/12 |
| 2021/0207671 A1 | 7/2021 | Siegel et al. | |

OTHER PUBLICATIONS

Zelinski, "Lighter, Better-Performing Brake Rotor From 3D Printing: The Cool Parts Show #27," Additive Manufacturing, Mar. 31, 2021, 6 pp.

U.S. Appl. No. 17/446,893, filed Sep. 3, 2021, by Bartolomeo et al.

U.S. Appl. No. 17/930,192, filed Sep. 7, 2022, naming inventor Black.

U.S. Appl. No. 17/930,239, filed Sep. 7, 2022, naming inventor Black.

* cited by examiner

CONE CLUTCH SYSTEM INCLUDING INDEPENDENT FRICTION MEMBER This invention was made with government support under contract W911W6-19-9-0005 awarded by the Department of Defense. The government has certain rights in the invention.

TECHNICAL FIELD

The disclosure relates to cone clutch assemblies and systems that include the same.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes cone clutch assemblies, systems including such assemblies, and techniques for making and using the same. An example cone clutch assembly may include an inner cone member (or "male cone") that is configured to selectively engage an outer cone member (or "female cone") with an independent friction member positioned between the opposing surfaces of the outer and inner cone members. For example, the independent friction member may not be mechanically attached to either the inner cone member or the outer cone member, e.g., allowing the friction member to rotate freely from the inner and outer cone member when the cone members are not engaged with each other via the friction member. In this manner, the differential speed between the outer cone member and inner cone member when transitioning to an engaged configuration may be less than if the inner cone member and outer cone member contacted each other directly when engaged. In some examples, the independent friction member may include one or more features to define an oil annulus to maintain the friction member relative to the inner cone member and/or outer cone member when the clutch assembly is in a disengaged configuration.

In some examples, the disclosure describes a cone clutch assembly comprising an inner cone member configured to be rotationally coupled to a first shaft, the inner cone member defining a first friction surface; an outer cone member configured to be rotationally coupled to a second shaft, the outer cone member defining a second friction surface opposing the first friction surface; and an independent friction member positioned between the first friction surface of the inner cone member and the second friction surface of the outer cone member, wherein the inner cone member and outer cone member are configured to be selectively engaged and disengaged from each other, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

In some examples, the disclosure describes a method of operating a cone clutch assembly, the method comprising engaging an inner cone member with the outer cone member with an independent friction member positioned between the first friction surface of the inner cone member and the second friction surface of the outer cone member, wherein the inner cone member is rotationally coupled to a first shaft and defines a first friction surface, wherein the outer cone member is rotationally coupled to a second shaft and defines a second friction surface, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

The details of one or more examples are set forth in the accompanying drawings and the description below. Other features, objects, and advantages will be apparent from the description and drawings, and from the claims.

DETAILED DESCRIPTION

Figure 1:
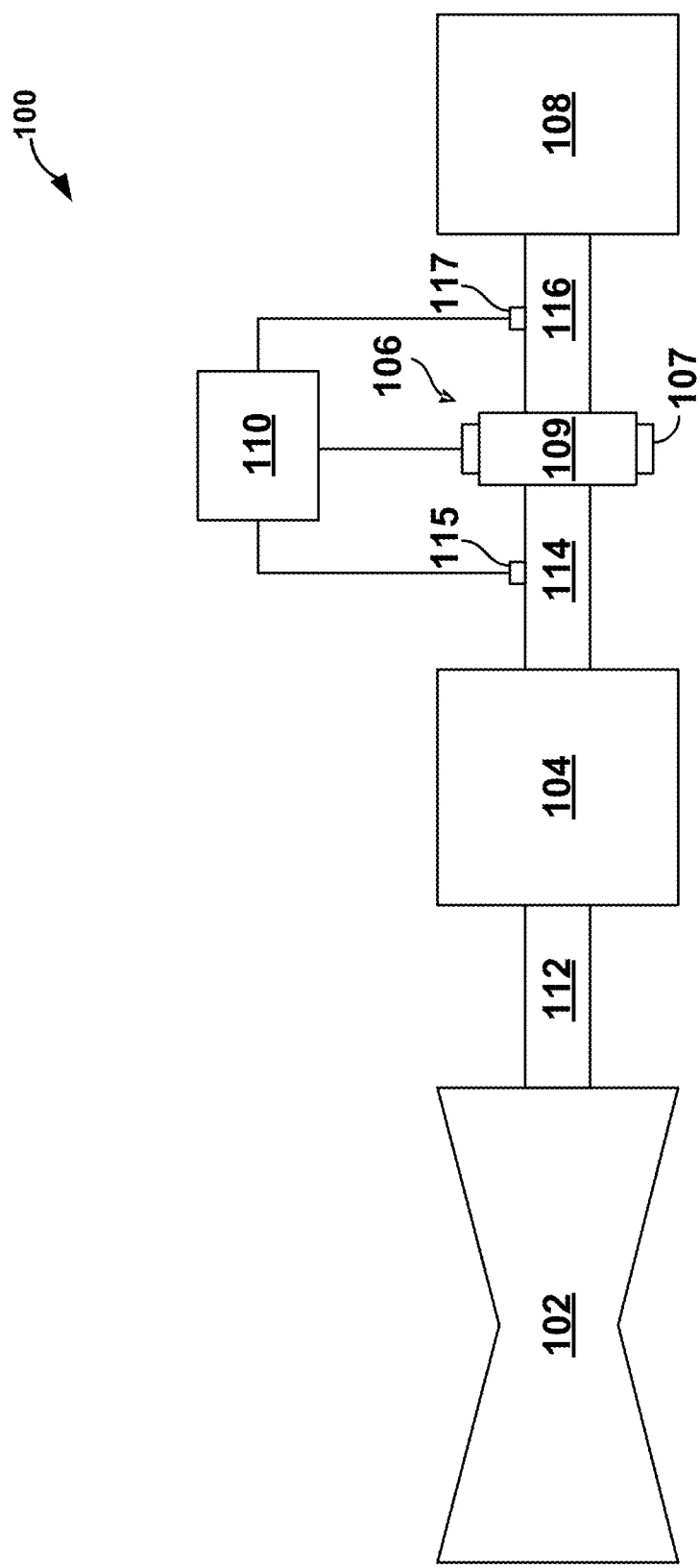
FIG. 1 is a conceptual diagram illustrating an example system including an example cone clutch assembly.

The disclosure generally describes systems including a cone clutch assembly, and techniques for using the same. The cone clutch assembly may include an inner cone member (or "male cone") that is configured to selectively engage an outer cone member (or "female cone") with an independent friction member positioned between the opposing surfaces of the outer and inner cone members. For example, the independent friction member may not be mechanically attached to either the inner cone member or the outer cone member, e.g., allowing the friction member to rotate freely from the inner and outer cone member when the cone members are not engaged with each other via the friction member. In this manner, the differential speed between the outer cone member and inner cone member when transitioning to an engaged configuration may be less than if the inner cone member and outer cone member contacted each other directly when engaged. In some examples, the independent friction member may include one or more features to define an oil annulus to maintain the friction member relative to the inner cone member and/or outer cone member when the clutch assembly is in a disengaged configuration.

In some examples, cone clutch assemblies may be used to control engagement of system accessories, such as aircraft accessories of gas turbine engine systems. In some examples, the clutch assembly may engage or disengage a reduction gearbox which drives a propeller for forward thrust of the aircraft, such as a helicopter. The cultch assembly may be driven by an engine via the helicopter reduction gearbox. Other uses of such as clutch assembly are contemplated.

A cone clutch assembly may have an input and an output shaft selectively coupled or decoupled (also referred to as engaged and disengaged) by two mating cone members, e.g., to selectively connect and disconnect, respectively, power/motion in a driveline. The input shaft may be continually driven by prime mover such as an engine or motor. The output shaft of the clutch can be engaged or disengaged from the prime mover allowing it to drive or disconnect driven assemblies such as gearboxes, fans, generators, etc. The cone members may be selectively engaged or coupled together by application of an axial force to clamp the inner (male) and outer (female) cone members together via friction. Typically, one cone member may be constructed from steel and the other member incorporates a friction liner to uniformly control friction and provide wear resistance. The liner may be used to control friction and improve wear resistance, and may be fabricated from materials such as bronze, carbon/carbon, Kevlar fiber encapsulated by a binder material or other friction tolerant materials to provide the clutch function. The steel cone member may be case or core hardened for durability.

Cone clutches may offer a number of significant advantages over other styles of clutches in terms of compact packaging and low weight. Power density and circumferential velocities at the friction (rubbing) surfaces may control the package size of the arrangement. These limitations are driven by wear and/or temperatures at the friction (rubbing) surfaces of the clutch. The temperatures are typically controlled by some type of cooling media, such as oil, that is directed into the friction surfaces.

The friction surfaces between the two mating cone members can be difficult to cool and lubricate for high speed/high friction surface velocity applications. Oil supply may provide a cooling and lubrication medium for the cone members. However, the interface can be very difficult to oil cool due to the high energy levels and high differential speeds between the cone members for compact designs. This energy should be dissipated in a very short time interval required to engage the clutch. The high differential speeds between the cone members can create high temperatures which are difficult to control in these very compact designs. These high temperatures may cause premature wear and/or melting of the liner material and/or liner bonding materials, leading to low clutch life. In high-speed applications, the differential surface velocities may be particularly key to providing a high life compact design.

In accordance with examples of the disclosure, a cone clutch assembly may include a friction member between the inner and outer cone members that is independent from the respective cone members. The friction member may be independent from the respective cone members in that the friction member may not be mechanically attached to a surface of either of the respective cone member. The friction member may be independent from the respective cone members in that the friction member may be rotated freely between the respective cone members, e.g., when both the inner and outer cone members are not rotating. In some examples, when the clutch assembly is not engaged, the independent friction member may be caused to rotate by the rotation of a respective cone member driven by the input shaft but the rotation may not be one to one. Rather, the friction member may be caused to rotate at a rotational speed that is less than the cone member driven by the input shaft. However, when the cone members are in an engaged configuration, the independent friction member may rotate at speed that is substantially the same as the inner and outer cone members, e.g., due to the friction engagement between the cone members via the friction member.

In some examples, employing an independent friction member may allow for one or more design features. In some examples, both the inner and outer cone members can be constructed of hardened steel surfaces at the friction/rub interface or other materials with good wear properties. In this approach, the friction member becomes a separate independent member from the inner and outer cone members. This friction member can be constructed from a high strength support layer that acts as a backing layer to support one or more layers of friction material. This support layer can be constructed from any higher strength material such as steel. Layer(s) of friction material may be bonded or otherwise attached to the support layer. The friction material can be attached to both the surface of the support layer opposing the inner cone member and the surface of the support layer opposing the outer cone member. The friction material may not have a lot of strength and the support layer may help to carry any engagement and/or centrifugal loads.

This approach may provide an independent friction member with two friction surfaces. The one friction surface mates with the inner cone member and another one of the surfaces mates with the outer cone member. This approach may lower the differential speeds and relative velocities at each friction interface during the engagement process when transitioning the clutch assembly from a disengaged configuration to engaged configuration. The lower differential speeds may reduce the lining power at each interface and reduce the friction surface temperatures. The independent friction member, when transitioning from a disengaged configuration to engaged configuration, may rotate at a speed that is approximately midway between the inner cone member speed and the outer cone member speed. This approach can permit lower oil flows, and/or more compact designs for the clutch design.

During the operation of a system that includes a cone clutch assembly coupled to an input shaft of an engine, one cone member of the clutch assembly may rotate whenever the engine is operating. This cone member may be either the inner cone or outer cone member. For ease of description, the examples are primarily described and shown with the inner cone member being such a rotating member, e.g., with the inner cone member being rotationally coupled to the input shaft, although examples of the disclosure include where the outer cone member is driven by an input shaft. In some examples, as the friction surfaces of the independent friction member wear, the friction member may become mis-positioned relative to the cone member when the clutch assembly is in a disengaged configuration. This may result in contact between the independent friction member, the rotating cone (e.g., inner cone) and the stationary cone (outer cone) in the disengaged configuration. In some examples, the contact may impart undesired rotation into the stationary cone member (outer cone member).

To prevent such rotation, some examples of the disclosure relate to an assembly design that includes an oil annulus chamber (also referred to as a fluid annulus chamber) between the independent friction member and the cone member, e.g., as shown in the examples of FIGS. 3A-7. By keeping this annulus full of oil or other fluid, the friction member may always be positioned against the inner cone member (e.g., the cone member driven by the input shaft) at the friction interface during operation regardless of how much wear occurs in the friction lining, e.g., positioned on the independent friction member. This positioning may occur anytime the inner cone member is rotating. The centrifugal force imparted on the oil annulus creates an opposing force between the independent friction member and the outer cone member (the stationary member when disengaged in this example) thus keeping them mated together regardless of wear conditions. This prevents any drag force from being imparted between the stationary cone member, independent friction member, and rotating cone for the disengaged configuration.

In some examples of such a design, to allow for the described operation, the maximum hydraulic dam inner diameter on the independent friction member is smaller than the minimum outer diameter of the inner cone member for any wear condition on the liner. This oil annulus creates opposing forces between the inner cone member and independent friction member. The oil annulus also may also incorporate a bleed orifice to assure oil is replenished to prevent slug build up. In some examples, the same oil annulus approach may be incorporated into the outer cone member for cone clutch assemblies in which the outer cone member is the continuously rotating member (member driven by the input shaft).

In some examples, such as those shown in FIGS. 3A-5, among others, the friction member may include a piston ring that serves to define the annulus dam. However, this dam could be created in multiple ways including approaches such as lip seals, piston rings, snap rings, and the like. The dam may be incorporated into the friction member in such a way to allow assembly of the cone members and friction member.

Figure 5:
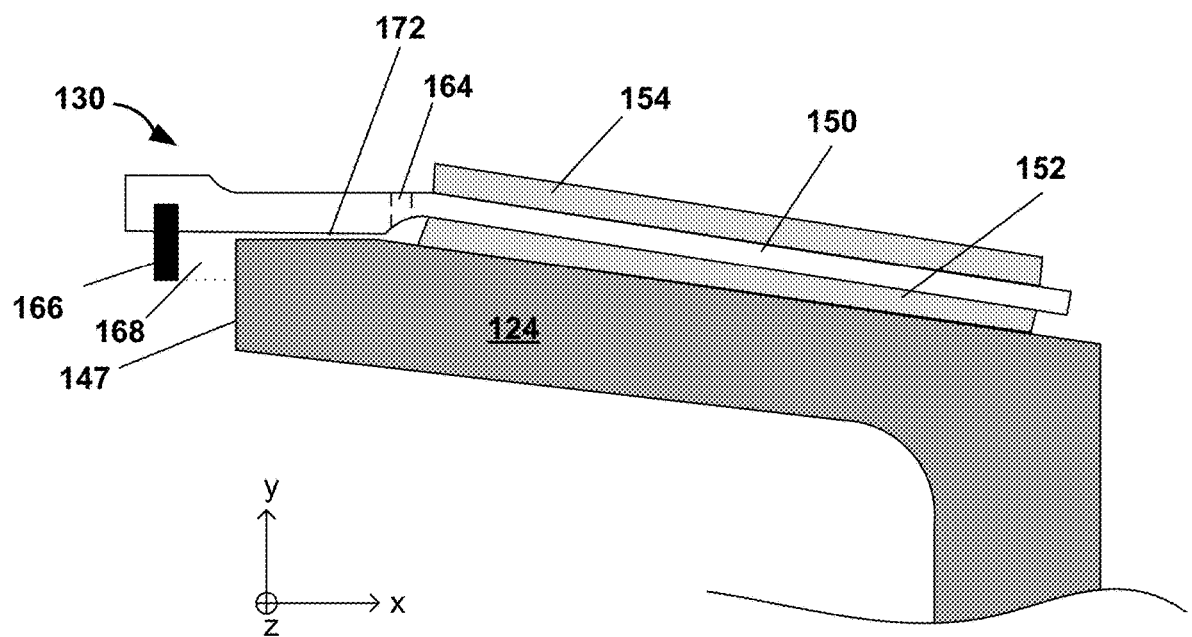
FIG. 5 is a conceptual diagram illustrating a portion of the inner cone member and independent friction member of another example clutch assembly.

In the example of FIG. 5, the independent friction member is shown without lubrication grooves built into the friction member surface. If any lubrication paths are introduced to the friction member, the oil supply to the oil annulus must be at a high enough rate to assure the annulus stays full of oil. Any leakage past the piston ring (and/or the optional bleed orifice) may also be compensated by annulus input flow. FIG. 5 shows an alternative example that incorporates a close clearance pilot diameter between the friction member and the inner cone member. The close clearance pilot may help to prevent droop and prevent contact with the outer cone member during shutdown but has enough clearance to prevent rub between the inner cone member and independent friction member. Again, the fluid/oil annulus may be supplied with enough oil to compensate for any oil leakage past the pilot clearance.

FIG. 1 is a conceptual diagram illustrating an example system 100 including cone clutch assembly 106. System 100 may include, for example, an engine 102, an accessory gear box 104, cone clutch assembly 106, an accessory component 108 (accessory 108), and a controller 110. As will be described further below, clutch assembly 106 includes two cone clutch members 109 (individually shown as outer cone member 122 and inner cone member 124 in FIG. 2 for example). System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine. One example of a system that incorporate cone clutch assembly 106 may include a system in which an aircraft engine (such as a gas turbine engine) drives a reduction gearbox which drives the input into the clutch assembly and helicopter rotors. The clutch assembly may drive, when engaged, a reduction gearbox which drives a propeller to increase forward velocity of the helicopter.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 may be selectively coupled to an output shaft 116 via cone clutch assembly 106 so that output shaft 116 is rotationally driven by input shaft 114 when cone clutch assembly 106 is engaged and, conversely, when cone clutch assembly 106 is disengaged, output shaft 116 is not driven by input shaft 114. Input shaft 114 may be coupled (e.g., rotationally fixed) to inner cone member 124 (shown in FIG. 2) of clutch assembly 106, and outer cone member 122 (shown in FIG. 2) of clutch assembly 106 may be coupled (e.g., rotationally fixed) to output shaft 116. As used herein, the outer cone member 122 may also be referred to as a female cone member, and the inner cone member 124 may also be referred to as a male cone member. Although system 100 is described herein primarily with inner cone member 124 being fixed to input shaft 114 and with outer cone member 122 being fixed to output shaft 116, in other examples, inner cone member 124 may be fixed to output shaft 116 and outer cone member 122 may be fixed to input shaft 114. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives. As noted above, in some examples, rather than driving an accessory, output shaft 116 may drive a propeller of a helicopter to increase the forwards velocity of the helicopter.

In some examples, system 100 may include at least one of rotational sensors 115 and 117. Rotational sensors 115 and 117 are configured to sense a rotational speed of input shaft 114 (or a cone member coupled to input shaft 114) and output shaft 116 (or the other cone member coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (or couple cone member) or output shaft 116 (or the other cone member). In some examples, controller 110 may be configured to receive signals from at least one of rotational sensors 115 or 117 and control, based on a rotational speed determined based on the signal, an electrical current applied to electromagnet 107.

In the example shown in FIG. 1, controller 110 may selectively engaged and disengage clutch assembly 106 as described herein, e.g., to selectively drive output shaft 116 via input shaft 114. For example, as described further below, controller 110 may control the axial position of outer cone member 122 relative to inner cone member 124, e.g., via an actuator. To engage clutch assembly 106, controller 110 may move inner cone member 124 towards outer cone member 122 to frictionally engage opposing surfaces of members 122, 124. Conversely, to disengage clutch assembly, controller 110 may move inner cone member 124 away from outer cone member 122 to frictionally disengage opposing surfaces of members 122, 124.

As described herein, independent friction member 130 may be located between the opposing friction surfaces of outer cone member 122 and inner cone member 124 such that the opposing friction surfaces of the cone members do not directly frictionally engage each other but instead are engage across friction member 130. Independent friction member 130 may not be mechanically attached to either inner cone member 124 or outer cone member 122, e.g., allowing the friction member to rotate freely from the inner and outer cone members 124, 122 when the cone members are not engaged with each other via friction member 130. In some examples, when the clutch assembly is not engaged, the independent friction member 130 may be caused to rotate by the rotation of inner cone member 124 driven by input shaft 114. In some examples, friction member 130 may be caused to rotate at substantially the same speed as inner cone member 124 when assembly 106 is in a disengaged configuration. In some examples, the speed of the rotation of friction member 130 and inner cone member 124 in the disengaged configuration may not be one to one. Rather, friction member 130 may be caused to rotate at a rotational speed that is less than inner cone member 124 driven by input shaft 114 (e.g., while outer cone member 122 is stationary). In this manner, the differential speed between outer cone member 122 and inner cone member 124 when transitioning to an engaged configuration may be less than if the inner cone member 124 and outer cone member 122 contacted each other directly when engaged.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the position of outer cone member 122 relative to inner cone member 124. Controller 110 may be communicatively coupled to the various component of system 100 including, e.g., the actuator or other component configured to axially move inner cone member 124 relative outer cone member 122, sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 2:
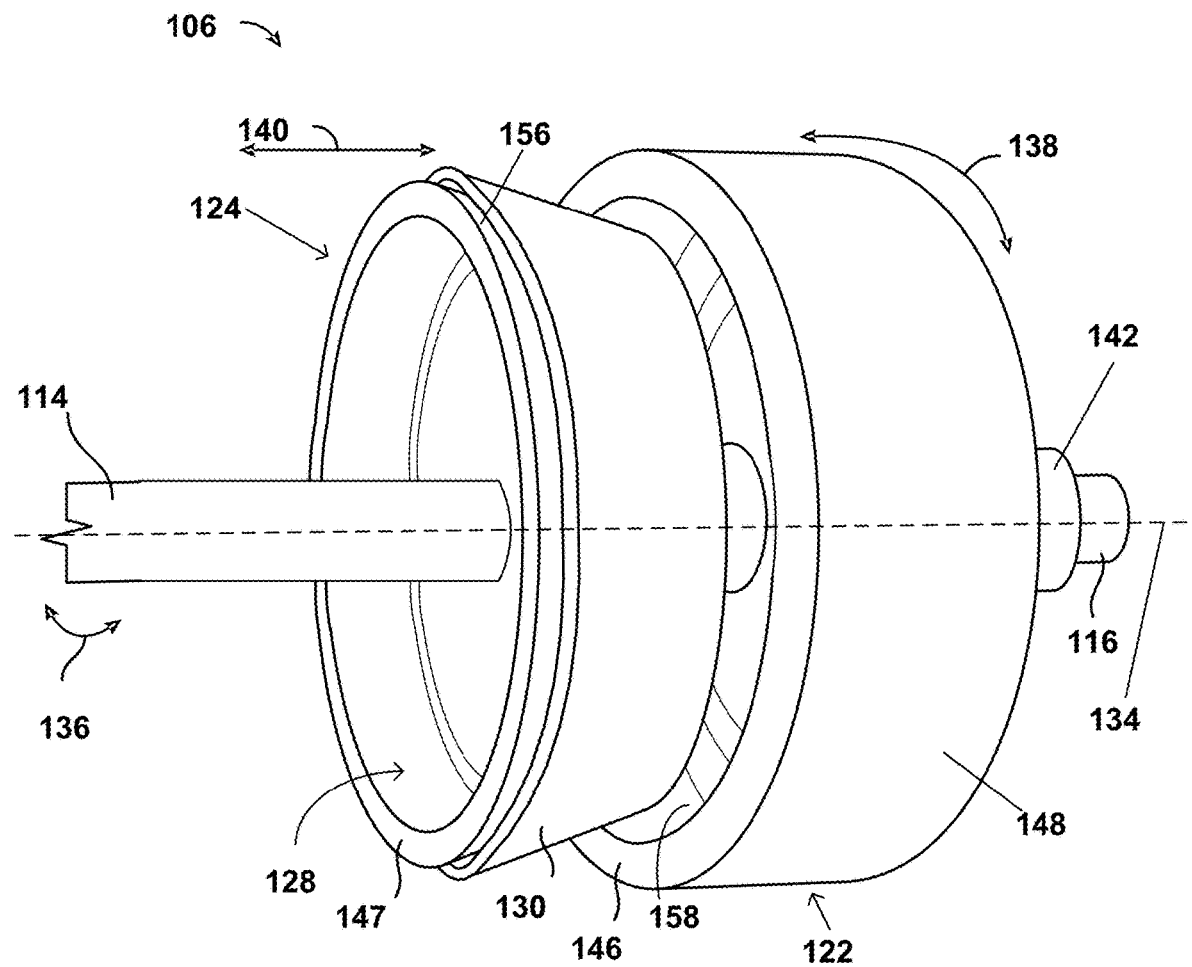
FIG. 2 is a conceptual diagram illustrating an example cone clutch assembly.
Figure 3A:
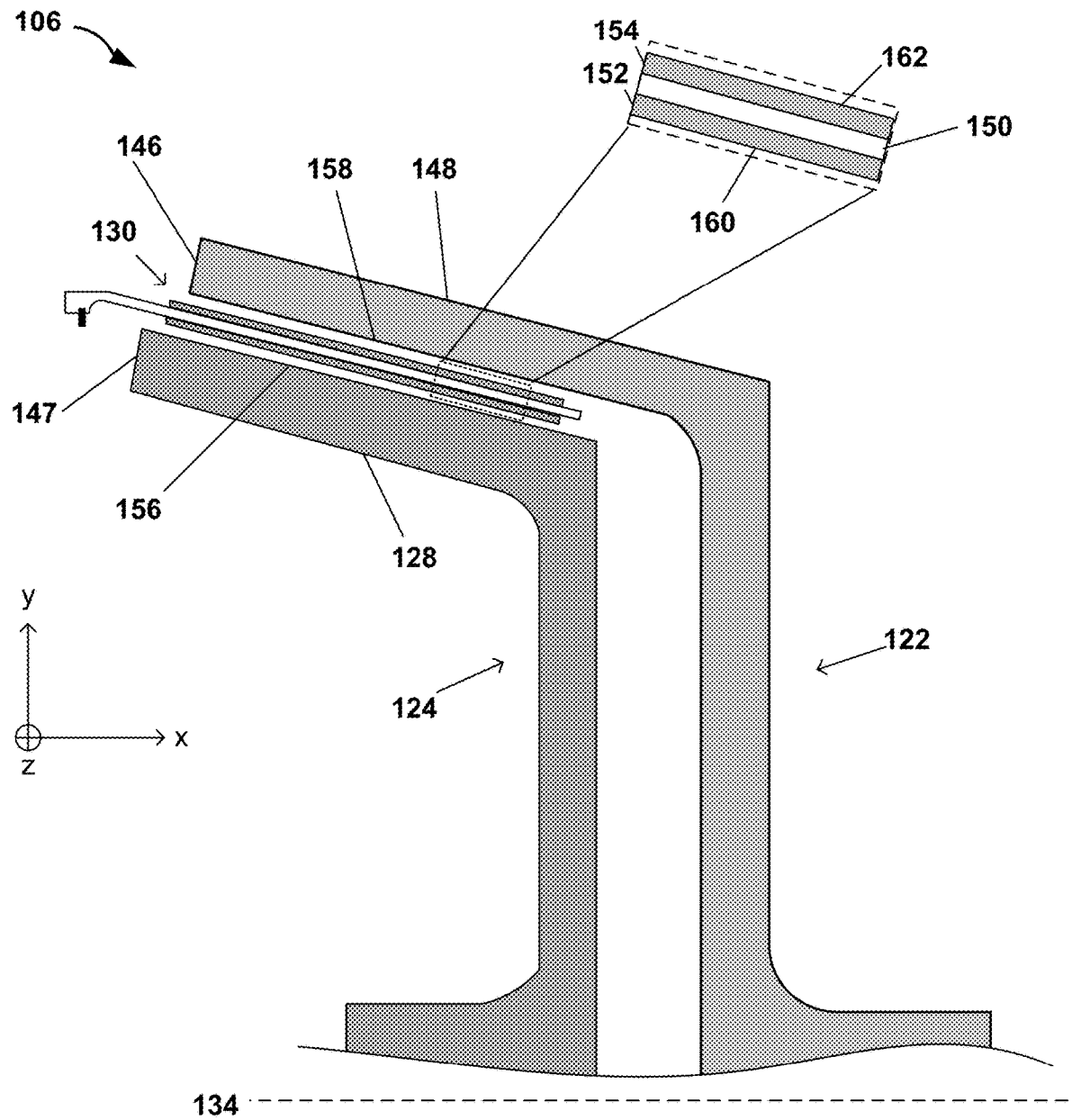
FIGS. 3A and 3B are simplified conceptual diagrams illustrating cross-sections of a portion of an example cone clutch assembly.
Figure 3B:
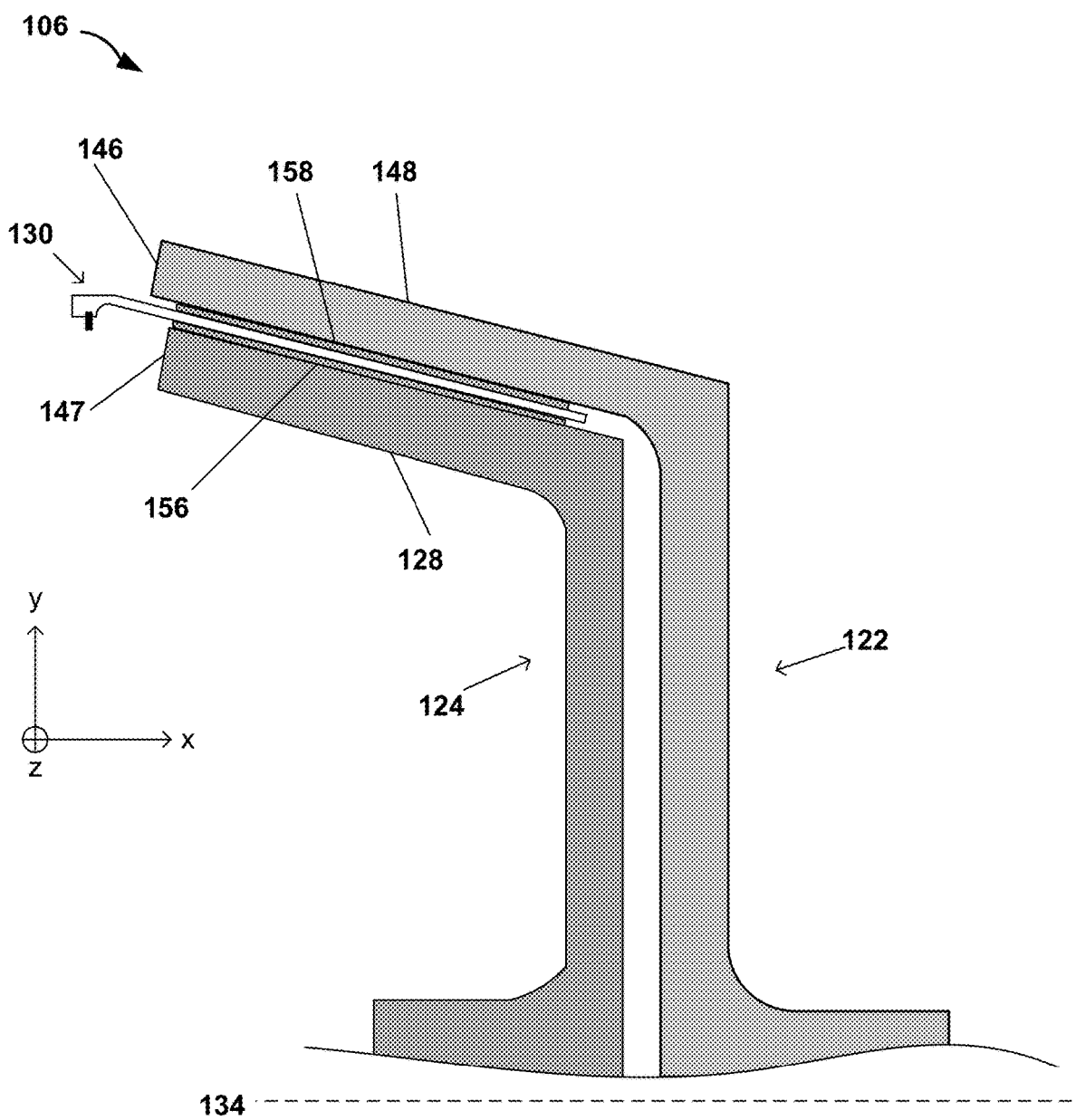
Figure 4:
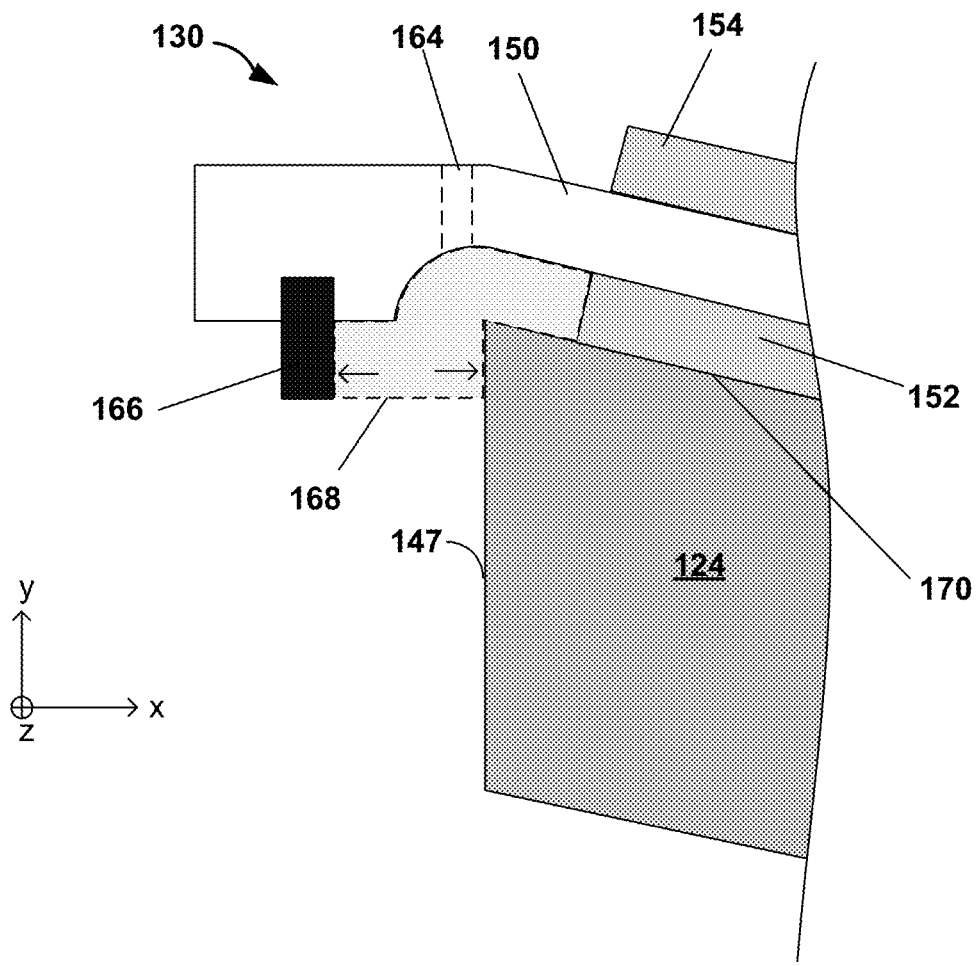
FIG. 4 is a conceptual diagram illustrating a magnified view of a portion of the inner cone member and independent friction member shown in FIGS. 3A and 3B.

FIG. 2 is a conceptual diagram illustrating an example cone clutch assembly 106 that may be used in system 100. FIGS. 3A and 3B are conceptual diagrams showing a simplified cross-section of a portion of cone clutch assembly 106 in disengaged and engaged, respectively configurations. FIG. 4 is conceptual diagram illustrating a magnified view of a portion of inner cone member 124 and friction member 130 shown in FIGS. 3A and 3B showing the structure of friction member 130 forming a hydraulic dam at the annulus in further detail. FIG. 5 is a conceptual diagram illustrating another example in which friction member 130 includes a close clearance pilot diameter between friction member 130 and the inner cone member 124.

While the examples of FIGS. 2-5 show examples in which inner cone member 124 is driven by output shaft 114, in other examples, outer cone member 122 may be driven by input shaft 114. In such examples, the hydraulic dam defined by friction member 130 may be relative to outer cone member 122 rather than inner cone member 124.

Cone clutch assembly 106 includes inner cone member 124 attached or otherwise fixed (e.g., rotationally fixed) to input shaft 114, and outer cone member 122 attached or otherwise fixed (e.g., rotationally fixed) to output shaft 116. Input shaft 114 and inner cone member 124 rotate about axis 134 in direction(s) 136. Likewise, outer cone member 122 and output shaft 116 rotate about axis 134 in direction(s) 138 when driven by input shaft 114, e.g., when clutch assembly 106 is in an engaged configuration.

Inner cone member 124 includes first friction surface 156 and inner surface 128 on the back side of first friction surface 156. Outer cone member 122 include second friction surface 158 and outer surface 148. Independent friction member 130 is positioned between first friction surface 156 and second friction surface 158 so that when clutch assembly 106 is engaged, first friction surface 156 and second friction surface 158 do not directly contact each other. Instead, first friction surface 156 and second friction surface 158 are each brought into contact with the respective opposing surfaces of independent friction member 130. For example, as better shown in FIG. 3A, friction member 130 defines a third friction surface 160 and a fourth friction surface 162. First friction surface 156 faces third friction surface 160, and second friction surface 158 faces fourth friction surface 162. When in an engaged configuration, first friction surface 156 contacts and frictionally engages third friction surface 160 and, likewise, second friction surface 158 contacts and frictionally engages fourth friction surface 162.

As shown in FIGS. 3A and 3B, with the generally conical shape, the friction surfaces of inner cone member 124 and outer cone member 122 are orientated at an angle relative to rotational axis 134 (which extends substantially parallel to the x-axis shown in FIGS. 3A and 3B) that is greater than zero and less than 90 degrees. The angle of the opposing friction surfaces of inner cone member 124 and outer cone member 122 may be generally the same so as to allow for relatively evenly distributed contact between the friction surface with the inner cone member 124 and outer cone member 122 are engaged with each other, e.g., as shown in FIG. 3B, across independent friction member 130.

Cone clutch assembly 106 is configured to be selectively transitioned between an engaged configuration and disengaged configuration. For example, inner cone member 124 is moveable relative to outer cone member 122 along translation direction 140 that is substantially parallel to rotational axis 134. For ease of illustration, clutch assembly 106 is shown in FIGS. 2 and 3A in a disengaged configuration. To transition to an engaged configuration such as that shown in FIG. 3B, outer cone member 122 may be moved, e.g., under the control of controller 110, towards inner cone member 124 so that first friction surface 156 contacts and frictionally engages third friction surface 160 and, likewise, second friction surface 158 contacts and frictionally engages fourth friction surface 162.

Actuator 142 may be employed to selectively engage and disengage the clutch assembly. To engage the clutch assembly, actuator 142 may selectively apply an axial force to inner cone member 124 that moves outer cone member 122 towards inner cone member 124 so that first friction surface 156 contacts and frictionally engages third friction surface 160 and, likewise, second friction surface 158 contacts and frictionally engages fourth friction surface 162. The frictional engagement may allow for transfer of rotation between outer cone member 122 and inner cone member 124, e.g., so that input shaft 114 drives the rotation of output shaft 116. When engaged, the rotational speed of output shaft 116 may be approximately the same as input shaft 114 about axis 134. To disengage clutch assembly 106, the force applied by actuator 142 may be removed, e.g., under the control of controller 110, to allow for a gap or other frictional disengagement between the opposing friction surfaces 156, 160, 158, and 162. When disengaged, inner cone member 124 may rotate freely without rotating outer cone member 122.

Although not shown, clutch assembly 106 may be a wet clutch with a fluid being delivered to the friction surfaces of outer cone member 122 and inner cone member 124. In such an example, a fluid such as an oil may be present between first friction surface 156 and third friction surface 160 and, likewise, between second friction surface 158 and fourth friction surface 162 when clutch assembly 106 is disengaged like that shown in FIG. 3A. The fluid may be supplied to the cavity within a housing (not shown) that contains clutch assembly 106, or components thereof.

Any suitable actuator device may be used to move inner cone member 124 relative to outer cone member 122 along translation direction 140 to engage the respective cone members across friction member 130. For example, assembly 106 may include actuator 142 in the form of a spring or a hydraulic actuator to actuate the clutch assembly. In some examples, actuator 142 may operate on hydraulic pressure acting on a piston to actuate the clutch. The hydraulic piston pressure may be controlled by a controller 110 to control the pressure. The piston may have a rod side and a head side (pressure acts on both sides of the piston) to both actuate and retract the piston. Additionally, or alternatively, a spring may be used to selectively apply and/or remove the axial force acting on outer cone member 122.

In the example of FIGS. 3A and 3B, independent friction member 130 includes support layer 150 with first layer of friction material 152 and second layer of friction material 154 on support layer 150, with support layer 150 being between first layer of friction material 152 and second layer of friction material 154. Support layer 150 may be a backing layer to support one or more layers of friction material, such as layers 152, 154. Support layer 150 be constructed from a higher strength material such as steel or other metallic material compared to that of layers 152, 154. In some examples, support layer 150 may be formed of a case or core hardened material. Layers 152, 154 may be formed of a material better suited as a friction material having desirable friction and wear resistance with less strength that support layer 150. Suitable friction materials for layers 152, 154 may include bronze, carbon/carbon composites, Kevlar fiber encapsulated by a binder material or other friction tolerant materials to provide the clutch/friction function described herein. Layer 152 and layer 154 may be formed of the same or different friction material.

First layer of friction material 152 and second layer of friction material 154 may be attached or otherwise bonded to support layer 150, e.g., using any suitable technique. In some examples, first layer of friction material 152 and second layer of friction material 154 are removably attached to support layer 150 so that first layer of friction material 152 and/or second layer of friction material 154 may be removed and replaced when the friction material has been worn away beyond a threshold amount.

Inner cone member 124 and outer cone member 122 may be formed of any suitable material such as a metal or metal alloy material. In some examples, inner cone member 124 and outer cone member 122 may be formed of steel. In some examples, the friction or rub surface of inner cone member 124 and outer cone member 122 may be hardened (e.g., via nitriding or carburizing) to improve the durability of inner cone member 124 and outer cone member 122.

Figure 7:
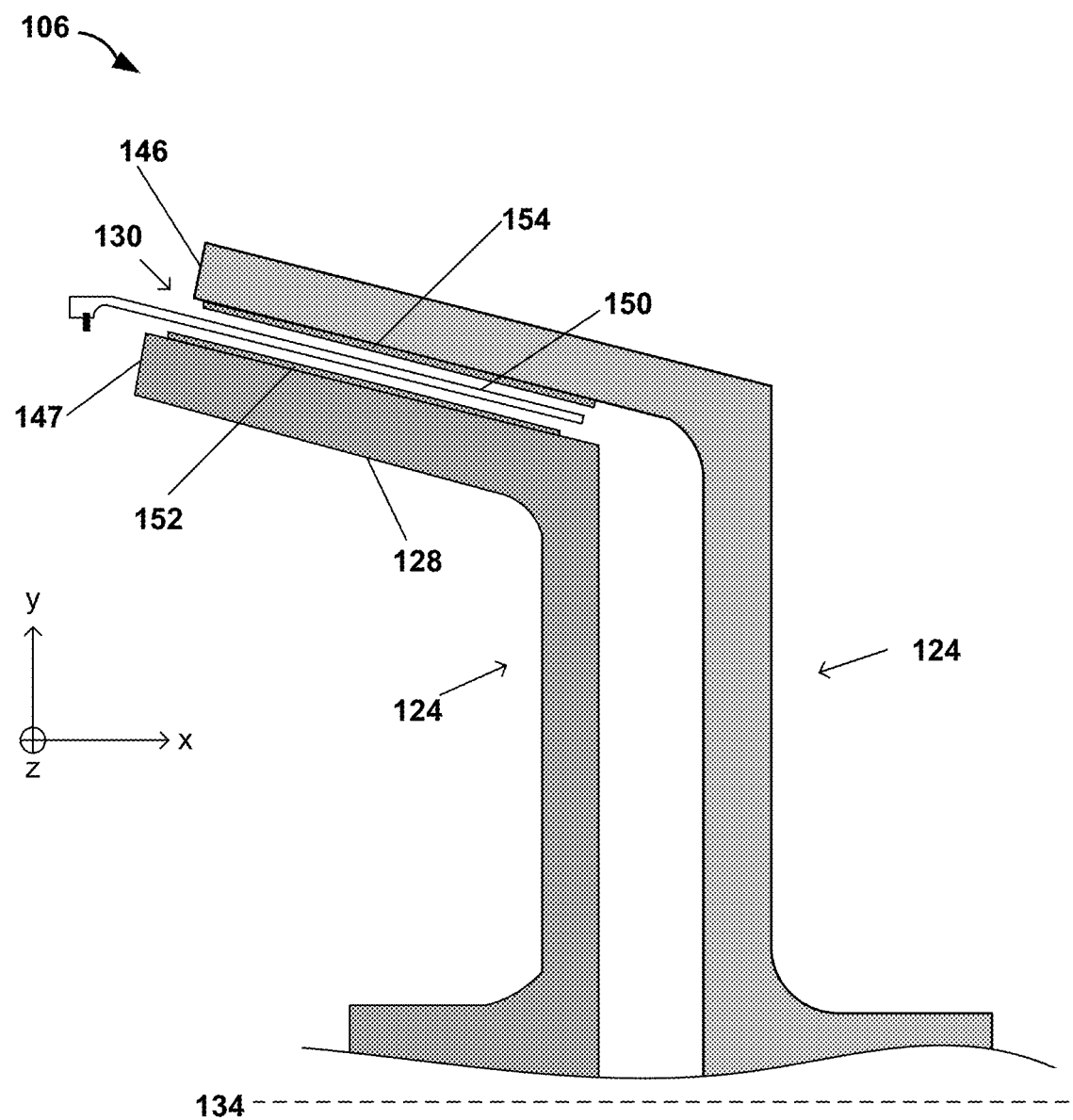
FIG. 7 is a conceptual diagram illustrating a portion of the inner cone member, outer cone member, and independent friction member of another example clutch assembly.

In some examples, first layer of friction material 152 and/or second layer of friction material 154 may be additionally, or alternatively, located on the opposing surfaces of inner cone member 124 and outer cone member 122, respectively. FIG. 7 is a conceptual diagram illustrating such an example with friction member 130 including support layer 150 without a friction layer attached. In such an example, first layer of friction material 152 is on (e.g., attached to) inner cone member 124 and second layer of friction material 154 is on (e.g., attached to) outer cone member 122. When clutch 106 is in engaged configuration, first layer of friction material 152 and second layer of friction material 154 are both brought into contact with support layer 150 to frictionally engage inner cone member 124 and outer cone member 122 across friction member 130.

First layer of friction material 152 and second layer of friction material 154 may have any suitable thicknesses (e.g., in the direction substantially orthogonal to the frictional engagement interface. The thicknesses may be the same or different from each other. In some examples, each of thickness may be substantially constant over the length of the respective layer, or one or more of thicknesses may vary in thickness, e.g., with portions being thicker and other portions being thinner. In some examples, the thickness of first layer 152 and second layer 154 may be about 0.045 inches but may be thicker or thinner. Support layer 150 may be any suitable thickness.

When clutch assembly 106 is in an engaged configuration, independent friction member 130 may rotation at substantially the same rate as inner cone member 124 and outer cone member 122, e.g., due to the friction engagement described above. When in the disengaged configuration, the speed of inner cone member 124 may be different from outer cone member 122 with inner cone member 124 being driven by input shaft 114, and with outer cone member 122 being substantially stationary or otherwise not driven by input shaft 114 across friction member 130.

In some examples, in a disengaged configuration, friction member 130 may be rotated indirectly by inner cone member 124 but at a speed substantially equal to or less than the rotational speed of inner cone member 124. For example, with a hydraulic chamber (not shown) enclosing clutch assembly 106 filled with oil or other fluid and with the rotation of a protrusion defining an annulus volume (such as protrusion 166 defining annulus volume 168 in FIG. 4), a centrifugal force may be created to force inner cone member 124 and friction member 30 together. When initiating a start-up (e.g., when starting the rotation of inner cone member 124 from a stationary position), inner cone member 124 will spin the oil or other fluid in annulus volume 168 and create a circumferential driving force and impart centrifugal loads on the oil/fluid annulus. The loads imparted by the oil start spinning/rotating friction member 130 and creates an axial force between inner cone member 124 and friction member 130 to force them together. Friction member 130 may continue to rotate with inner cone member 124 in the disengaged configuration of assembly 106. While there may be some light rub/contact that between the input (inner cone member 124) and output (outer cone member 122) during the start-up, which could create some slight rotation of the output (outer cone member 122) until the oil annulus forms, such an occurrence would only be for lower speeds and for a very short time.

In such instances, friction member 130 may accelerate slowly up to the same speed as inner cone member 124 upon start up. As friction member 130 accelerates, the hydraulic annulus 168 will fill with fluid (e.g., oil) and force inner cone member 124 and friction member 130 to run at approximately the same speed. The hydraulic annulus creates a force to press inner cone member 124 and friction member 130 together. When transitioning assembly 106 to an engaged configuration from a disengaged configuration, the driven member (inner cone member 124) will engage these 2 members and will force friction member 130 to seek a rotational speed approximately half-way between inner cone member 124 and outer cone member 122, e.g., since torque is created at both cone members. Once the engagement is completed, all members (inner cone member 124, outer cone member 122, and friction member 130) will rotate at approximately the same speed. Since the torque will be slightly different between the two friction rub surfaces and one cone member has an additional resistance force caused by the hydraulic annulus, the differential speed may not be exactly half but such a deviation may be addressed to balance the difference.

In this manner, when cone clutch assembly 106 is transitioned to the engaged configuration from the disengaged configuration with the inner cone member 124 rotating, the first differential speed between first friction surface 156 and third friction surface 160 and the second differential speed between second friction surface 158 and fourth friction surface 162 may each be less than the differential speed between first friction surface 156 and second friction surface 158, e.g., in cases in which first friction surface 156 and second friction surface 158 directly engage each other without friction member 130 being between first friction surface 156 and second friction surface 158. As noted herein, this approach may lower the differential speeds and relative velocities at each friction interface compared to systems without independent friction member 130 and direct contact between inner cone member 124 and outer cone member 122. Lower differential speeds may reduce the lining power at each interface and reduce the friction surface temperatures. In some examples, independent friction member 130 may rotate at a speed that is approximately midway between the inner cone member speed and the outer cone member speed. In general, such an approach may permit lower oil flows, and/or more compact designs for the clutch design.

As noted above, in some examples, as the friction surfaces (surfaces 160 and/or 162) of independent friction member 130 wear, the friction may become mis-positioned relative to the cone member when the clutch assembly is in a disengaged configuration. This may result in contact between independent friction member 130, the rotating cone (inner cone 124 in the example of FIG. 3A) and the stationary cone (outer cone 122 in the example of FIG. 3A) in the disengaged configuration. In some examples, the contact may impart undesired rotation into the stationary cone member (outer cone member).

In some examples, independent friction member 130 may include one or more structures to assist in positioning friction member 130 relative to inner cone member 124 and outer cone member 122. FIG. 4 is a magnified view of a portion of an example of friction member 130 and inner cone member 124 near the back surface 147 of inner cone member 124. As shown, rather than being a completely planar member, support layer 150 includes a protrusion 166 adjacent to back surface 147 of inner cone member 124. Protrusion 166 forms a fluid annulus volume 168 between inner cone member 124 and friction member 130 relative to protrusion 166. Protrusion 166 may be configured so that the inner diameter of friction member 130 relative to rotational axis 134 is smaller than the outer diameter of inner cone member 124 at back surface 147, e.g., to form an oil/fluid dam. Put another way, the bottom edge of protrusion 166 should be lower (close to the rotational axis 134) as compared to the top edge of inner cone member 124 at back surface 147 to assure that there will be an opposing force on cone member 124 and friction member 130 to assure the respective components are pushed together by a full annulus volume 168, as described herein.

By keeping this annulus volume 168 full of oil or other fluid, the friction surface of friction member 130 (third friction surface 160) may always be positioned against the opposing friction surface (first friction surface 156) of inner cone member 124 at friction interface 170 during operation regardless of how much wear occurs in first layer of friction material 152, e.g., as positioned on the independent friction member 130 support layer 150. For example, as shown by the two arrows in FIG. 4, the fluid annulus created by protrusion 166 creates opposing forces between inner cone member 124 and independent friction member 130 to position friction member 130 as described herein, e.g., even when clutch assembly is in a disengaged configuration.

The fluid annulus formed by protrusion 166 may ensure inner cone member 124 is positioned against friction member 130 to prevent any contact with outer cone member 122 except with in the engaged configuration. Thus, protrusion 166 prevents friction member 130 from contacting both cone members at same time when assembly 106 is in the disengaged configuration.

Figure 6A:
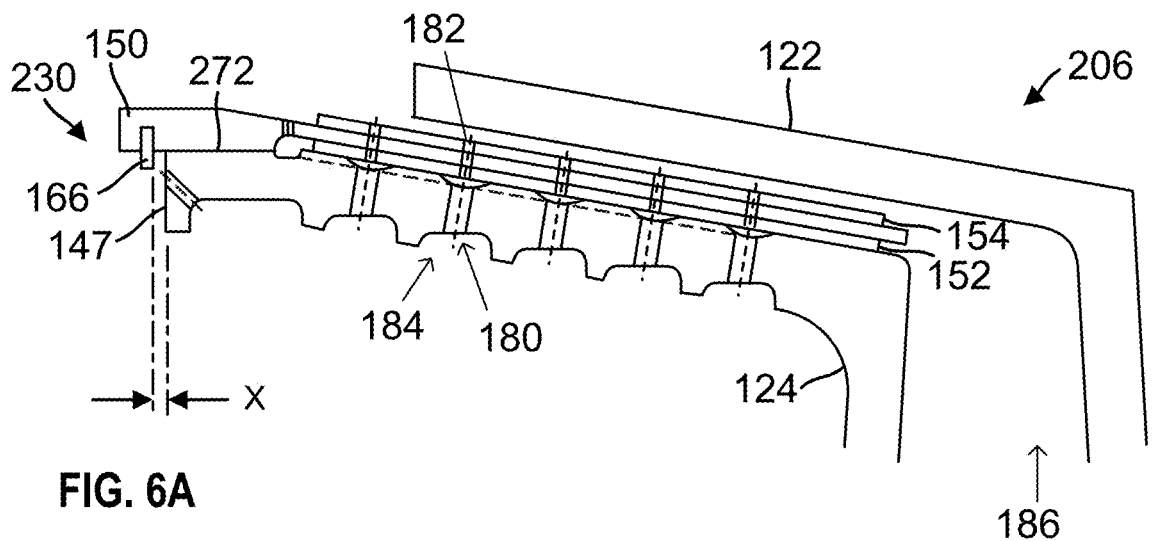
FIGS. 6A-6C are conceptual diagrams illustrating a portion of the inner cone member, outer cone member, and independent friction member of another example clutch assembly.
Figure 6B:
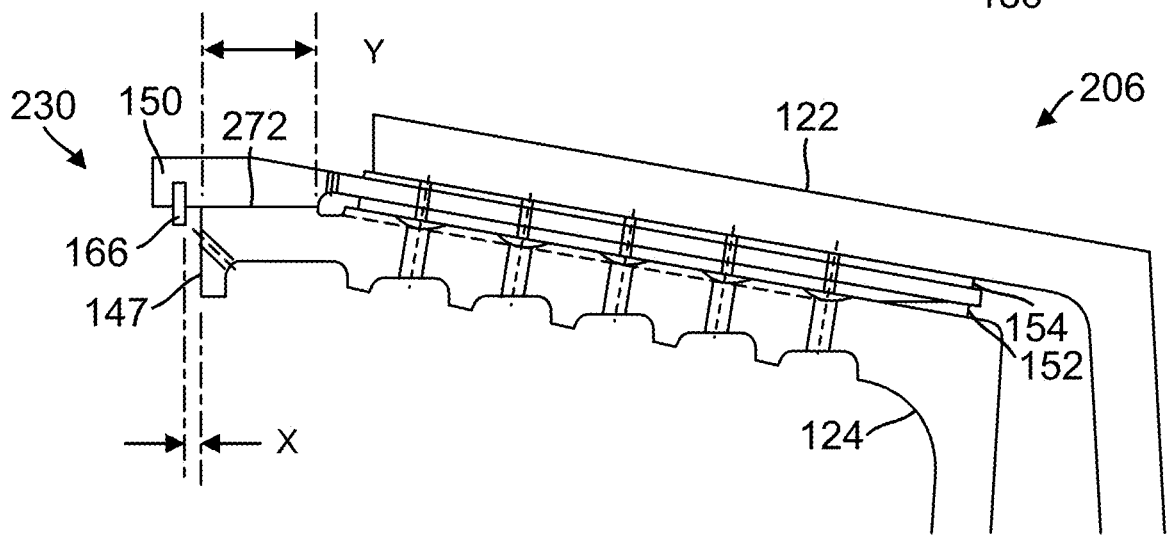
Figure 6C:
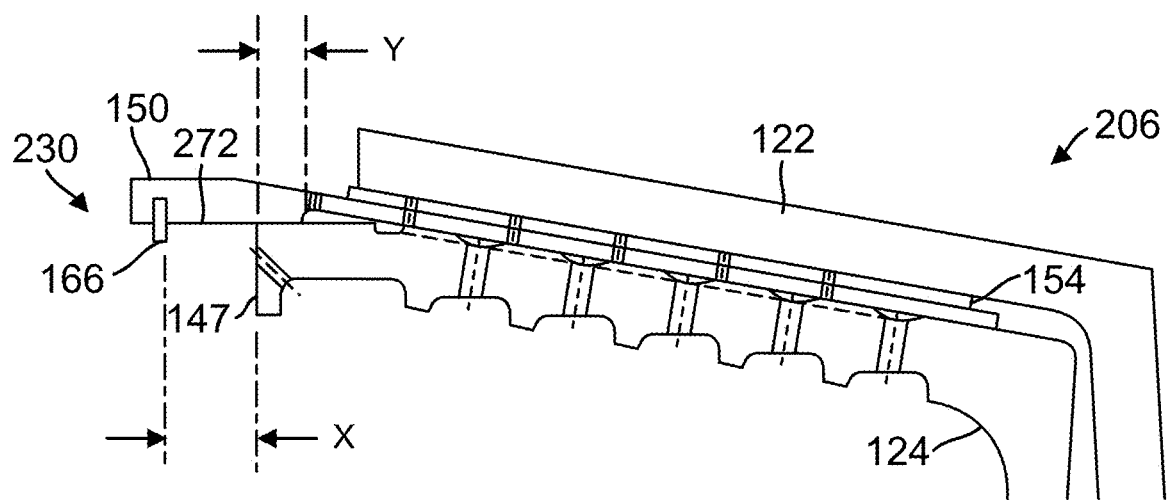

Fluid such as oil may be supplied to annulus volume 168 using any suitable technique. The example of FIGS. 6A-6B described below illustrates a configuration in which oil is delivered to annulus volume 168 via under cone through holes (such as through hole 180) supplying oil to the inner diameter/friction surface 158. In some examples, oil (or other fluid) is supplied to both friction surfaces 156 and 158 to cool and lube friction member 130. This lube/cooling oil can also supply the annulus. Such cooling/lube oil may be expelled from the clutch assembly in any suitable manner. One example is through optional orifice 164. This orifice may also be large enough to expel heated oil but not so large that it will collapse the annulus. Additionally, or alternatively, oil may also over flow the annulus/protrusion 166 lip. In the example of FIGS. 6A-6C (which is an example with a pilot), the piloted independent member may separate the cooling oil from the oil annulus. In such a configuration, there may be a better chance of oil heating since the cooling oil may be allowed to exit from the liner/friction member 130 without collapsing the annulus of oil.

In some examples, independent friction member 130 may include one or more optional bleed orifices such as optional bleed orifice 164. Bleed orifice 164 may assure oil or other fluid is replenished to annulus volume 168 to prevent slug build up. In some example, orifice 164 provides an exit for lubricating/cooling oil supplied to inner friction layer 152.

Protrusion 166 of friction member 130 may be formed using any suitable technique. In some examples, protrusion 166 is formed by a piston ring that serves to define the annulus dam. In other examples, protrusion 166 that forms such a dam may be created in multiple ways including approaches such as lip seals, piston rings, snap rings, and the like.

FIG. 5 is conceptual diagram illustrating another example configuration of friction member 130 in accordance with examples of the disclosure. For ease of illustration, only a portion of inner cone member 124 is shown with independent friction member 130, and outer cone member 122 is not shown. The orientation shown in FIG. 5 is that of an example clutch assembly in a disengaged configuration. Like that described above for the example of FIG. 4, friction member 130 in FIG. 5 includes protrusion 166 to define fluid annulus volume 168, e.g., that forms a hydraulic dam, to keep friction member 130 in contact with inner cone member 124 when clutch assembly 106 is in a disengaged configuration. Friction member 130 includes optional bleed orifice 164, which may provide an exit for oil supplied to inner friction layer 152. In FIG. 5, optional bleed orifice 164 is located in friction member 130 adjacent to friction layer 152 and with pilot 172 between orifice 164 and back surface 147/protrusion 166/fluid annulus volume. In other examples, optional bled orifice 164 may be additionally or alternatively located within pilot diameter 172 and/or adjacent back surface 147, protrusion 166, and/or fluid annulus volume (e.g., in the position shown in FIG. 4).

In addition to protrusion 166, friction member 130 has a shape that defines a close clearance pilot diameter 172 relative to inner cone member 124, e.g., that forms a small gap in the pilot location between the friction member 130 and the inner cone member 124, as shown in FIG. 5. The close clearance pilot diameter 172 may help to prevent droop and prevent contact with outer cone member 122 during shutdown but has enough clearance to prevent rub between inner cone member 124 and independent friction member 130 (e.g., even when first layer of friction material 152 is worn down). The pilot may keep the friction member 130 and inner cone member 124 centered with each other. Oil or other fluid will fill the gap at the pilot diameter 172 and help prevent wear of the pilot, e.g., similar with what is done on a bearing separator. As the liner/layer 152 wears away, friction member 130 may move further axially toward inner cone member 124 until the liner/layer 152 is worn out completely. As described herein, the fluid/oil annulus volume 168 may be supplied with enough oil to compensate for any oil leakage past the pilot clearance.

FIGS. 6A-6C are conceptual diagrams illustrating a portion of an example of clutch assembly 206 with independent friction member 230 including formed with a clearance pilot diameter 272 like that described above with regard to FIG. 5. Clutch assembly 206 may be substantially the same as clutch assembly 106 and like features are similarly numbered. In the example of FIGS. 6A-6C, friction member 230 include a plurality of optional through holes such as through hole 182 extending through layers 150, 152, and 154 of friction member 230. Inner cone member 124 also includes a plurality of optional through holes such as through hole 180 extending from the back side of inner cone member 124 to the friction surface adjacent to layer 152. Through holes 180 may be formed in optional grooves in the back side such as groove 184 that extends circumferentially around inner cone member 124. Through holes 180 and 182 may be substantially aligned with each other. In such an example, oil may be brought up through the inner cone member 124 inner diameter to lube the inner liner friction surface and oil brought up between the two mating cone members (e.g., at or near the rotational axis along path 186) will be centrifugally forced out to lubricate the outer cone member liner contact.

FIG. 6A shows a portion of inner cone member 124, independent friction member 230 and outer cone member 122 in a disengaged configuration, e.g., with first layer of friction material 152 having minimal or no wear into the friction surface. FIG. 6B shows the same portion as FIG. 6A but with clutch assembly 206 transitioned to an engaged configuration from that shown in FIG. 6A. FIG. 6C shows the same engaged configuration as FIG. 6B but with first layer of friction material 152 being worn down significantly.

As shown in the series of FIGS. 6A-6C, the gap X between the back surface 147 of inner cone member 124 and protrusion 166 is approximately the same between the configuration shown in FIGS. 6A and 6B. However, that gap X increases as first layer of friction material 152 is worn away as reflected in the change from FIG. 6B to FIG. 6C. Likewise, the distance Y between the front edge of the pilot diameter 272 and the back surface 147 decreases as first layer of friction material 152 wears away from FIG. 6B to FIG. 6C. Distance Y and distance X in FIGS. 6A-6C may be selected to maintain a minimum axial for the pilot for worst case condition (e.g., when one or both of layers 152 and 154 are worn away) and to ensure the annulus is full for the total stroke length.

Figure 8:
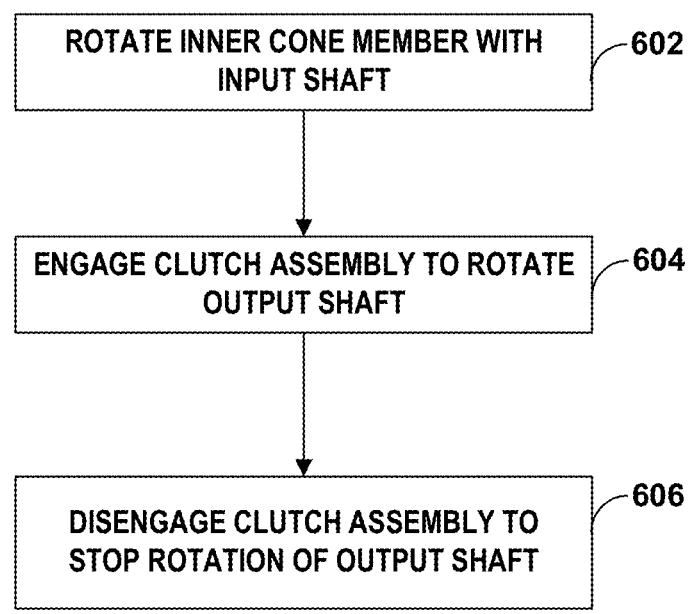
FIG. 8 is a flow diagram illustrating an example technique for operating a system including a cone clutch assembly in accordance with some examples of the disclosure.

FIG. 8 is a flow diagram illustrating an example technique for controlling engagement of an engine with an accessory using a cone clutch assembly. Using the technique of FIG. 8, controller 110 may control system 100 to selectively transfer rotational motion from accessory gear box 104 to accessory component 108 via clutch assembly 106 as described herein. For ease of description, the example of FIG. 8 will be described with regard to system 100 and cone clutch assembly 106 described above with regard to FIGS. 2, 3A, 3B, and 4. However, the technique may be used to control other systems and clutch assemblies. Additionally, system 100 and cone clutch assembly 106 may be controlled using other techniques.

The technique illustrated in FIG. 8 may include rotating inner cone member 124 around rotational axis 134 by the rotation of input shaft 114 (602). As discussed above, engine 102 may be configured to rotate input shaft 114, e.g., via drive shaft 112, accessory gear box 104, and input shaft 114. Outer cone member 122 may be disengaged from inner cone member 124 during the rotation of inner cone member 124, e.g., with actuator 142 not applying an axial force that forces first friction face 152 of inner cone member 124 against third surface 160 of friction member 130, and second friction face 158 of outer cone member 122 against fourth surface 162 of friction member 130.

Controller 110 may then selectively engage clutch assembly 106 to transfer rotational motion from input shaft 114 to output shaft 116, e.g., to drive accessory 108 (604). For example, controller 110 may actuate actuator 142 to apply an axial force to outer cone member 122 that moves outer cone member 122 towards inner cone member 124 so that first friction face 152 of inner cone member 124 engages third surface 160 of friction member 130, and second friction face 158 of outer cone member 122 engages fourth surface 162 of friction member 130. The applied force may allow for a frictional engagement between the four opposing friction surfaces. The frictional engagement may allow for transfer of rotation between outer cone member 122 and inner cone member 124, e.g., so that input shaft 114 drives the rotation of output shaft 116. Advantageously, the differential speed between outer cone member 122 and inner cone member 124 when transitioning to an engaged configuration may be less than if the inner cone member 124 and outer cone member 122 contacted each other directly when engaged. At some later point, controller 110 may disengage clutch assembly 106 to stop driving the rotation of output shaft 116, e.g., by moving outer cone member 122 axially away from inner cone member and independent friction member 130 (606). In some examples, controller 110 may operate to fill a piston cavity with fluid to either disengage or engage inner cone member 124 from outer cone member 122 (e.g., with fluid being delivered to either side of plunger in a piston cavity). The may allow for force to be applied in two directions with one direction applying an engagement force and the other direction applying a disengagement force.

Various examples have been described. These and other examples are within the scope of the following clauses and claims.

Clause 1. A cone clutch assembly comprising: an inner cone member configured to be rotationally coupled to a first shaft, the inner cone member defining a first friction surface; an outer cone member configured to be rotationally coupled to a second shaft, the outer cone member defining a second friction surface opposing the first friction surface; and an independent friction member positioned between the first friction surface of the inner cone member and the second friction surface of the outer cone member, wherein the inner cone member and outer cone member are configured to be selectively engaged and disengaged from each other, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

Clause 2. The clutch assembly of clause 1, wherein the independent friction member includes a first layer of friction material, a second layer of friction material, and a support layer between the first layer of friction material and the second layer of friction material, and wherein the first layer of friction material defines the third friction surface, and wherein the second layer of friction material defines the fourth friction surface.

Clause 3. The clutch assembly of clause 2, wherein the first layer of friction material and the second layer of friction material are attached to the support layer.

Clause 4. The clutch assembly of clause 1, wherein the independent friction member includes a support layer, the support layer defining the third friction surface and the fourth friction surface.

Clause 5. The clutch assembly of clause 4, wherein the inner cone member includes a first layer of friction material defining the first friction surface, and wherein the outer cone member includes a second layer of friction material defining the second friction surface.

Clause 6. The clutch assembly of any one of clauses 2-5, wherein the support layer includes a metallic layer.

Clause 7. The clutch assembly of any one of clauses 1-6, wherein the friction member includes a protrusion defining a fluid annulus volume between the friction member and a back surface of one of the inner cone member and the outer cone member.

Clause 8. The clutch assembly of clause 7, wherein, when the inner cone member is disengaged from the outer cone member, the one of the inner cone member and the outer cone member rotates and a fluid is configured to fill the fluid annulus volume to maintain a position of the friction member relative to the one of the inner cone member and the outer cone member.

Clause 9. The clutch assembly of clause 8, wherein, when the fluid annulus volume is filled with the fluid, the friction member rotates along with the one of the inner cone member and the outer cone member.

Clause 10. The clutch assembly of clause 8, further comprising the fluid.

Clause 11. The clutch assembly of any one of clauses 7 to 10, wherein one or more through holes are formed in the friction member to allow for a portion of the fluid to flow across the friction member.

Clause 12. The clutch assembly of any one of clauses 7 to 11, wherein the fluid is configured to lubricate the first friction surface and the second friction surface.

Clause 13. The clutch assembly of any one of clauses 1-12, further comprising a controller including control circuitry, wherein the controller is configured to selectively engage and disengage the inner cone member and the outer cone member from each other.

Clause 14. The clutch assembly of any one of clauses 1-13, wherein, when the inner cone member transitions from a disengaged configuration to an engaged configuration with the outer cone member, the first friction surface of the inner cone member frictionally engages a third friction surface of the friction member at a first differential speed, and the second friction surface of the outer cone member engages a fourth friction surface of the friction member at a second differential speed, and wherein the first differential speed and the second differential speed are both less than a third differential speed between the inner cone member and the outer cone member.

Clause 15. A method of operating a cone clutch assembly, the method comprising engaging an inner cone member with the outer cone member with an independent friction member positioned between the first friction surface of the inner cone member and the second friction surface of the outer cone member, wherein the inner cone member is rotationally coupled to a first shaft and defines a first friction surface, wherein the outer cone member is rotationally coupled to a second shaft and defines a second friction surface, wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member.

Clause 16. The method of clause 15, wherein the independent friction member includes a first layer of friction material, a second layer of friction material, and a support layer between the first layer of friction material and the second layer of friction material, and wherein the first layer of friction material defines the third friction surface, and wherein the second layer of friction material defines the fourth friction surface.

Clause 17. The method of clause 16, wherein the first layer of friction material and the second layer of friction material are attached to the support layer.

Clause 18. The method of clause 15, wherein the independent friction member includes a support layer, the support layer defining the third friction surface and the fourth friction surface.

Clause 19. The method of clause 18, wherein the inner cone member includes a first layer of friction material defining the first friction surface, and wherein the outer cone member includes a second layer of friction material defining the second friction surface.

Clause 20. The method of any one of clauses 16-19, wherein the support layer includes a metallic layer.

Clause 21. The method of any one of clauses 15-20, wherein the friction member includes a protrusion defining a fluid annulus volume between the friction member and a back surface of one of the inner cone member and the outer cone member.

Clause 22. The method of clause 21, further comprising disengaging the inner cone member from the outer cone member, wherein, when the inner cone member is disengaged from the outer cone member, the one of the inner cone member and the outer cone member rotates and a fluid is configured to fill the fluid annulus volume to maintain a position of the friction member relative to the one of the inner cone member and the outer cone member.

Clause 23. The method of clause 22, wherein, when the fluid annulus volume is filled with the fluid, the friction member rotates along with the one of the inner cone member and the outer cone member.

Clause 24. The method of any one of clauses 21 to 23, wherein one or more through holes are formed in the friction member to allow for a portion of the fluid to flow across the friction member.

Clause 25. The method of any one of clauses 21 to 24, wherein the fluid is configured to lubricate the first friction surface and the second friction surface.

Clause 26. The method of any one of clauses 15-25, wherein engaging the inner cone member with the outer cone member comprises: frictionally engaging the first friction surface of the inner cone member with a third friction surface of the friction member at a first differential speed, and frictionally engaging the second friction surface of the outer cone member with a fourth friction surface of the friction member at a second differential speed, wherein the first differential speed and the second differential speed are both less than a third differential speed between the inner cone member and the outer cone member.

What is claimed is:
1. A cone clutch assembly comprising:
an inner cone member configured to be rotationally coupled to a first shaft, the inner cone member defining a first friction surface;
an outer cone member configured to be rotationally coupled to a second shaft, the outer cone member defining a second friction surface opposing the first friction surface; and
an independent friction member positioned between the first friction surface of the inner cone member and the second friction surface of the outer cone member,
wherein the inner cone member and outer cone member are configured to be selectively engaged and disengaged from each other,
wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member, and
wherein the friction member includes a protrusion defining a fluid annulus volume between the friction member and a back surface of one of the inner cone member and the outer cone member.

2. The clutch assembly of claim 1, wherein the independent friction member includes a first layer of friction material, a second layer of friction material, and a support layer between the first layer of friction material and the second layer of friction material, and wherein the first layer of friction material defines the third friction surface, and wherein the second layer of friction material defines the fourth friction surface.

3. The clutch assembly of claim 2, wherein the first layer of friction material and the second layer of friction material are attached to the support layer.

4. The clutch assembly of claim 2, wherein the support layer includes a metallic layer.

5. The clutch assembly of claim 1, wherein the independent friction member includes a support layer, the support layer defining the third friction surface and the fourth friction surface.

6. The clutch assembly of claim 5, wherein the inner cone member includes a first layer of friction material defining the first friction surface, and wherein the outer cone member includes a second layer of friction material defining the second friction surface.

7. The clutch assembly of claim 1, wherein, when the inner cone member is disengaged from the outer cone member, the one of the inner cone member and the outer cone member rotates and a fluid is configured to fill the fluid annulus volume to maintain a position of the friction member relative to the one of the inner cone member and the outer cone member.

8. The clutch assembly of claim 1, wherein, when the fluid annulus volume is filled with the fluid, the friction member rotates along with the one of the inner cone member and the outer cone member.

9. The clutch assembly of claim 1, wherein one or more through holes are formed in the friction member to allow for a portion of the fluid to flow across the friction member.

10. The clutch assembly of claim 1, wherein the fluid is configured to lubricate the first friction surface and the second friction surface.

11. The clutch assembly of claim 1, further comprising a controller including control circuitry, wherein the controller is configured to selectively engage and disengage the inner cone member and the outer cone member from each other.

12. The clutch assembly of claim 1, wherein, when the inner cone member transitions from a disengaged configuration to an engaged configuration with the outer cone member, the first friction surface of the inner cone member frictionally engages a fifth friction surface of the friction member at a first differential speed, and the second friction surface of the outer cone member engages a sixth friction surface of the friction member at a second differential speed, and wherein the first differential speed and the second differential speed are both less than a third differential speed between the inner cone member and the outer cone member.

13. A method of operating a cone clutch assembly including an inner cone member and an outer cone member, the method comprising engaging the inner cone member with the outer cone member with an independent friction member positioned between a first friction surface of the inner cone member and a second friction surface of the outer cone member,
wherein the inner cone member is rotationally coupled to a first shaft and defines a first friction surface,
wherein the outer cone member is rotationally coupled to a second shaft and defines a second friction surface,
wherein, when the inner cone member is engaged with the outer cone member, the first friction surface of the inner cone member frictionally engages a third friction surface of the friction member, and the second friction surface of the outer cone member engages a fourth friction surface of the friction member such that rotational motion is transferred between the inner cone member and the outer cone member via the friction member, and
wherein the friction member includes a protrusion defining a fluid annulus volume between the friction member and a back surface of one of the inner cone member and the outer cone member.

14. The method of claim 13, wherein the independent friction member includes a first layer of friction material, a second layer of friction material, and a support layer between the first layer of friction material and the second layer of friction material, and wherein the first layer of friction material defines the third friction surface, and wherein the second layer of friction material defines the fourth friction surface.

15. The method of claim 14, wherein the first layer of friction material and the second layer of friction material are attached to the support layer.

16. The method of claim 14, wherein the support layer includes a metallic layer.

17. The method of claim 13, wherein the independent friction member includes a support layer, the support layer defining the third friction surface and the fourth friction surface.

18. The method of claim 17, wherein the inner cone member includes a first layer of friction material defining the first friction surface, and wherein the outer cone member includes a second layer of friction material defining the second friction surface.

\* \* \* \* \*